United States Patent [19]

Sakai et al.

[11] Patent Number: 5,676,373
[45] Date of Patent: Oct. 14, 1997

[54] PACKING WITH SEALING CHAMBERS

[75] Inventors: Hitoshi Sakai; Takashi Takagishi, both of Shizuoka, Japan

[73] Assignee: Yazaki Corporation, Tokyo, Japan

[21] Appl. No.: 708,493

[22] Filed: Sep. 5, 1996

[30] Foreign Application Priority Data

Sep. 7, 1995 [JP] Japan ................. 7-230180

[51] Int. Cl.$^6$ ................................ F16J 15/10
[52] U.S. Cl. ............ 277/205; 277/208; 439/559; 439/271; 439/272
[58] Field of Search ................. 277/205, 208; 439/559, 556, 271, 272, 277

[56] References Cited

U.S. PATENT DOCUMENTS 4,861,282  8/1989  Kobayashi et al. ............ 439/540
5,127,661  7/1992  Franson et al. ............... 277/205
5,377,999  1/1995  Gorman ....................... 277/205
5,511,464  4/1996  Cezanne et al. ............... 277/205

FOREIGN PATENT DOCUMENTS 62-109368  7/1987  Japan.

Primary Examiner—William A. Cuchlinski, Jr.
Assistant Examiner—Christina Annick
Attorney, Agent, or Firm—Armstrong, Westerman Hattori, McCleland & Naughton

[57] ABSTRACT

A sealing packing comprises an annular body, plural sealing projecting stripes formed in an upper surface of the annular body, and a plurality of ribs properly spaced between the sealing projecting stripes and extending from one edge of both inner and outer surrounding edges of the upper surface to the other edge to connect to each of the sealing projecting stripes. Plural small sealing chambers are formed in the upper surface by the sealing projecting stripes and the ribs.

1 Claim, 5 Drawing Sheets

FIG. 1
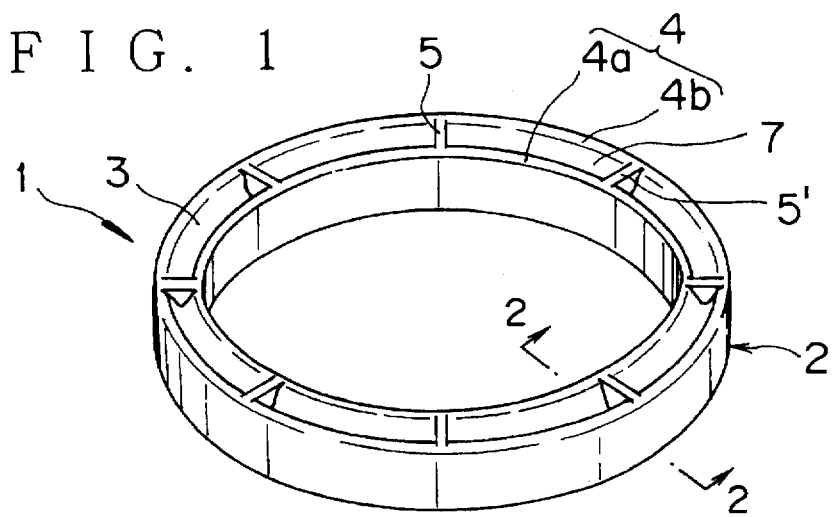
FIG. 2
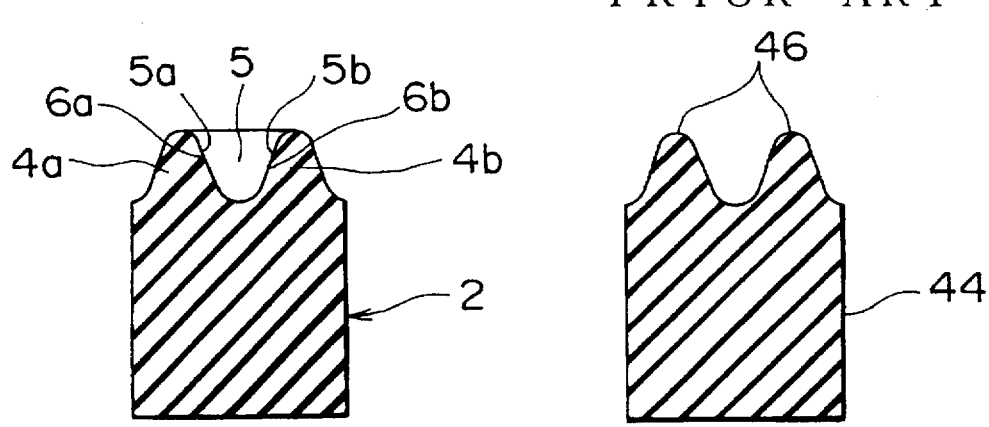
FIG. 11
PRIOR ART
FIG. 10
PRIOR ART
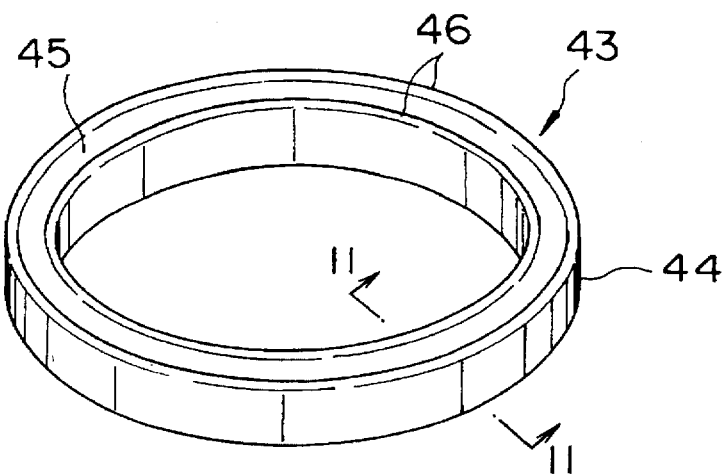

PACKING WITH SEALING CHAMBERS

BACKGROUND OF THE INVENTION

1. Field of the Invention

The present invention relates to a sealing packing which improves sealing performance, and a connector equipped with the packing which enhances sealing performance, the connector being directly fitted on walls of various type of appliance exposed to a liquid.

2. Description of the Prior Art

FIG. 7 shows a conventional waterproofing structure of a control unit for use in outdoor work which has been described in JAPANESE UTILITY MODEL APPLICATION laid-open No. 62-109388.

This waterproofing structure is a structure that fixes a mounting plate 24 of a rubber cover 28 of a connector 22 to a sidewall 20' of the control unit 20 by set bolts (not shown) or similar. A connector 22 which is connected to the connection portion 21 of the control unit 20 has the rubber cover 28. The rubber cover 28 includes the mounting plate 24, an end wall 28, and a flexible surrounding wall 27. The mounting plate 24 seals a front wall 23 of the connector 22. The end wall 26 seals plural wires 25 which backwardly extend the connector 22. The flexible surrounding wall 27, disposed between the mounting plate 24 and the end wall 26, seals an outer surrounding wall of the connector As shown in FIG. 8, the mounting plate 24 includes a plate 29 which is formed in a hexagon shape, two sealing projecting strips 31 which are formed in a front surface 30 of the plate 29, and a rectangular hole 34 which passes the connector 22 in a mid portion of the front surface 30. One strip 31a of the two sealing projecting strips 31 is formed between an inner surrounding edge 32 and an outer surrounding edge 32' of the hole 34, and the other strip 31b is arranged along the outer surrounding edge 32'. And the one strip 31a and the other strip 31b don't intersect each other. Further, a pair of bolt holes 33, 33 are formed in the plate 29 in order to set the mounting plate 24 on the sidewall 20' of the control unit 20.

FIG. 9 shows a conventionally used connector directly fitted to an electrical appliance. This connector fitted to an electrical appliance 35 includes a mounting plate 36, a bulkhead 38, a terminal disposing part 39, a connector receiving portion 40, connector terminals 41, an annular groove 42, and a sealing packing 43. The mounting plate 36 engages with a sidewall of various types of appliance (not shown). The bulkhead 38 has plural terminal inserting holes 37. The terminal disposing part 39 is formed in the mounting plate 36 at one side of the bulkhead 38. The connector receiving portion 40 receives another connector (not shown). The connector terminals 41 passing through a mounting face 36' of the mounting plate 36 from the terminal disposing part 39 extend into the connector receiving portion 40 and is secured in terminal inserting holes 37. The annular groove 42 facing the appliance surrounds the connector terminals 41 at a side of the mounting plate 38 and is formed into the mounting plate 36. The sealing packing 43 is set in the annular groove 42.

As shown in FIG. 10 and FIG. 11, the sealing packing 43 is comprised of a packing body 44 which is formed in a ring shape and two sealing projecting strips 46 which is formed in an upper surface 45 of the packing body 44.

However, in connection of the directly fitted connector to a wall of an appliance, as shown in FIG. 12, if each of the two sealing projecting strips 46 has a broken portion (A', B'), there is a drawback that sealing performance of the mounting plate 24 decreases so that liquid enters in the connector along a path shown by a dotted line. And the case of forming plural sealing projecting strips in the upper surface of the mounting plate causes also the same drawback as the case of the packing body 44 having the two sealing projecting strips 46.

SUMMARY OF THE INVENTION

An object of the present invention is to provide a sealing packing with keeping sealing performance, and a connector equipped with the packing which prevents an outer liquid from entering a connection portion between a wall of an appliance and the connector directly fitted to the appliance even if each of the two sealing projecting strips of the packing are partially broken.

A packing according to the present invention has plural small chambers which are separately formed in an upper surface of a packing body and composed of plural sealing projecting strips and plural ribs. Therefore, the sealing packing can keep sealing performance longer in comparison with a conventional used sealing packing. That is, the packing improves waterproofing performance. And, a connector directly fitted to an appliance which receives the sealing packing in the annular groove according to the present invention is attached to a wall of the appliance if one of the two sealing projecting strips portions composing of a small chamber is damaged while the other portion isn't ruptured, sealing performance, that is, waterproofing performance of the connector remains yet. Therefore, in comparison to the conventional used connector, the connector according to the present invention has improved more reliable waterproofing performance.

BRIEF DESCRIPTION OF THE DRAWING

FIG. 1 is a perspective view that shows one embodiment of a sealing packing according to the present invention;

FIG. 2 is a sectional view in the direction of X—X of the FIG. 1;

FIG. 10 is a perspective view that shows a conventional sealing packing;

FIG. 11 is a sectional view in the direction of Y—Y in FIG. 9; and

DESCRIPTION OF THE PREFERRED EMBODIMENTS

Figure 3:
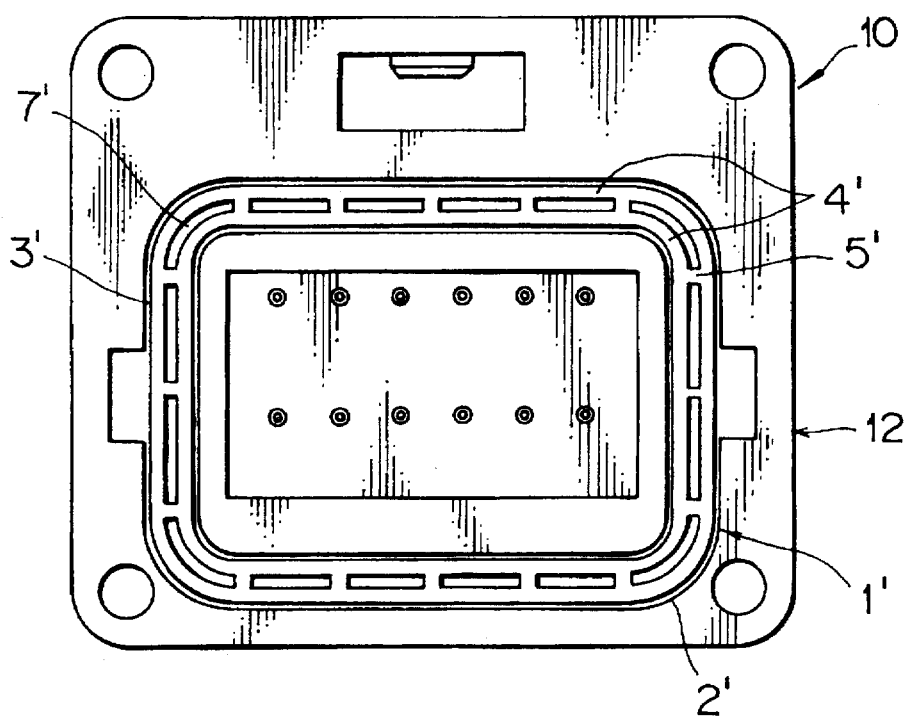
FIG. 3 is an elevational view that shows one embodiment of a connector equipped with a sealing packing according to present invention.

Both FIG. 1 and FIG. 2 illustrate a sealing packing of one embodiment according to the present invention.

The difference between a sealing packing 1 in this embodiment and the conventional used sealing packing 43 (FIG. 10) is that ribs 5 are arranged between two sealing projecting strip 4 and connect each of two sealing projecting strip 4.

These ribs 5 are extended from the inside sealing projecting strip 4a of the two sealing projecting strips 4 to the outside sealing projecting strip 4b (or from the outside sealing projecting strip 4b to the inside sealing projecting strip 4a) and are approximately orthogonally linked to both the inside sealing projecting strip 4a and the outside sealing projecting strip 4b. As shown in FIG. 2, one end 5a of the ribs 5 is attached to an inner sidewall 6a of the inside sealing projecting strip 4a, and the other end 5b of the ribs 5 is attached to an outer sidewall 6b of the outside sealing projecting strip 4b.

These ribs 5 are properly spaced and arranged between the two sealing projecting strips 4. And there is formed with one room comprising a small chamber 7 which is surrounded by two of ribs 5, 5', the inside sealing projecting strip 4a, and the outside sealing projecting strip 4b. Therefore, there are plurality of the small chamber 7 which is formed by the ribs 5 and two sealing projecting strips 4. Also it is possible to form integrally or separately the annular packing body 2 and a comparatively thin sealing member which has the two sealing projecting strips 4 and the ribs 5. In addition, although, in the embodiment, the two sealing projecting strips 4 are arranged around the upper edge part 3, it is possible to arrange more than two sealing projecting strips and plural ribs between these sealing projecting strips.

FIG. 3 through FIG. 6 illustrates one embodiment of the present invention which is a connector directly fitted to an appliance.

This connector 10 directly fitted to the appliance 11 has a sealing packing 1' inserted in an annular groove 17 which is formed in a mounting plate 12. Also, this sealing packing 1' is modified in shape from the sealing packing 1 so as to be inserted into the annular groove 17.

The sealing packing 1' is inserted in the annular groove 17 surrounding connector terminals 18. Small chamber 7' formed on an upper edge part 3' of a packing body 2' faces to a wall 11' of one appliance 11. When the insertion of the packing 1' is completed, an inner circumferential edge 3'a and an outer circumferential edges 3'b of the upper edge part 3' of the sealing packing 1', and an inner circumferential edge 17a and an outer circumferential edge 17b of the annular groove 17 respectively mate with each other. It is possible to form the connector 10 and the annular packing body 2 either integrally or separately. In addition, it is possible to form integrally the connector 10 and the sealing packing 1.

Next the case that sealing projecting strips 4' have had partially broken by water pressure will be described below.

Figure 4:
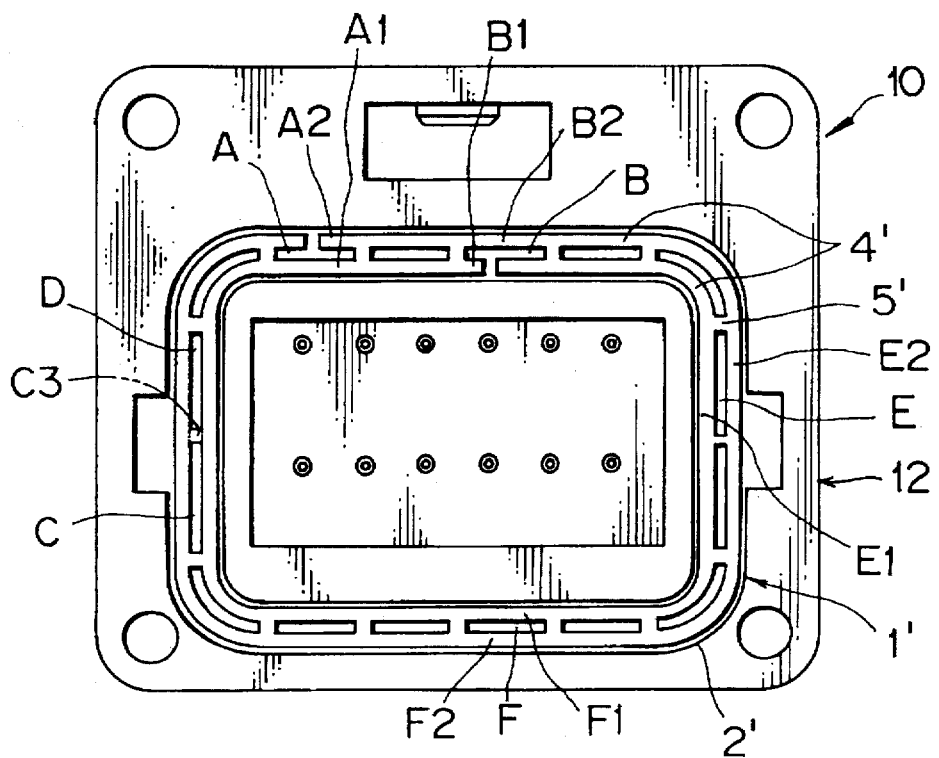
FIG. 4 is an elevational view which explains the case that the sealing projecting strip is partially broken.
Figure 5:
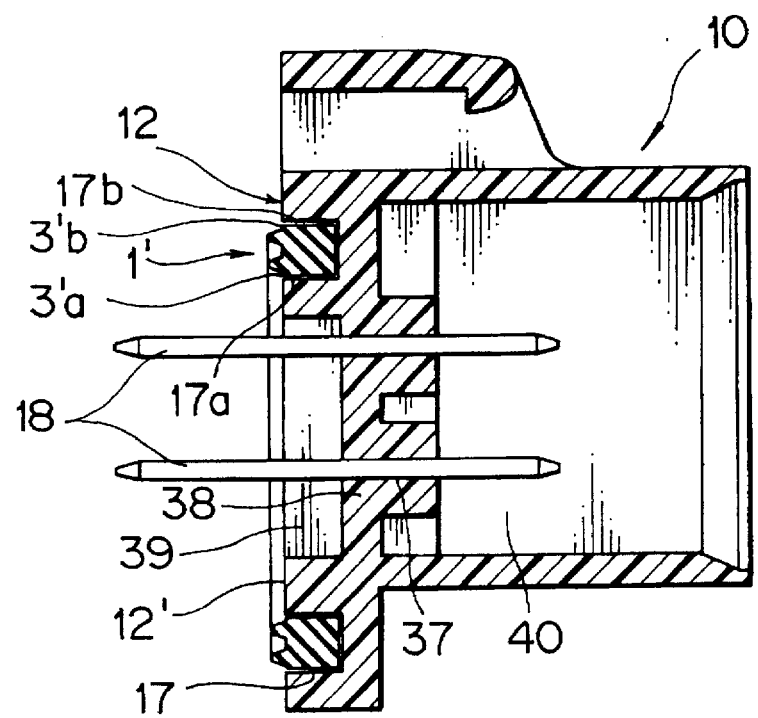
FIG. 5 is a longitudinal sectional view of FIG. 4.
Figure 6:
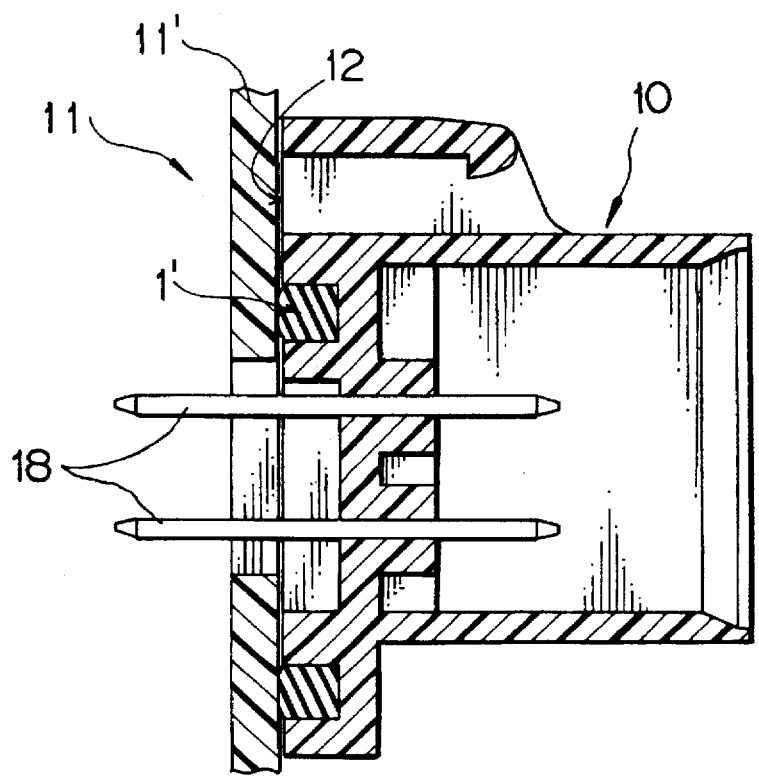
FIG. 6 is a longitudinal sectional view which shows the condition that the connector equipped with the sealing packing is directly mounted on a wall of an appliance.
Figure 7:
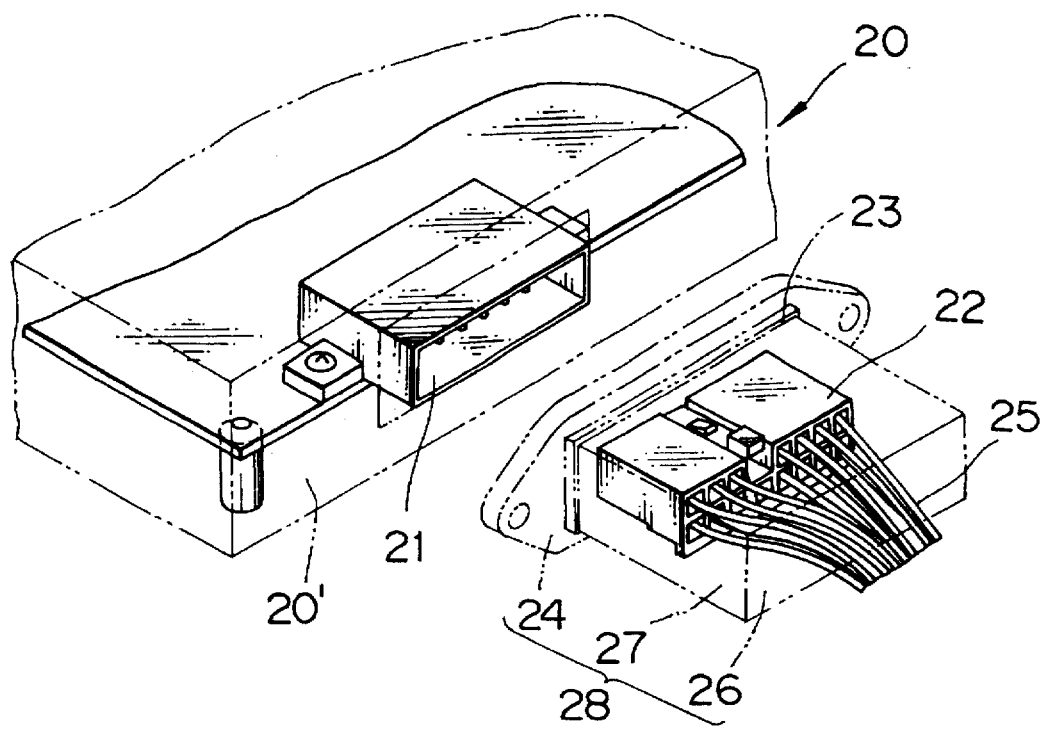
FIG. 7 is a perspective view that shows a conventional used connector.
Figure 8:
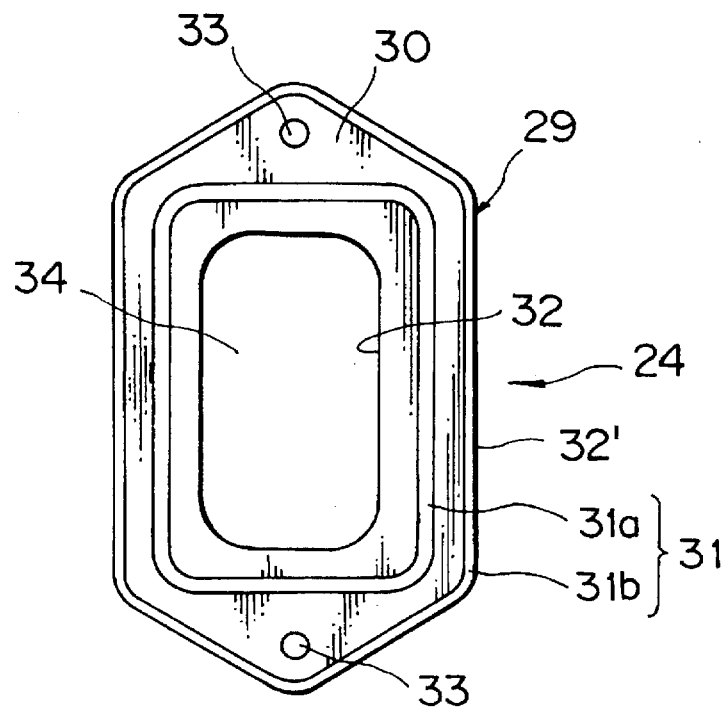
FIG. 8 is an elevational view that shows a mounting plate of the connector of FIG. 7.
Figure 9:
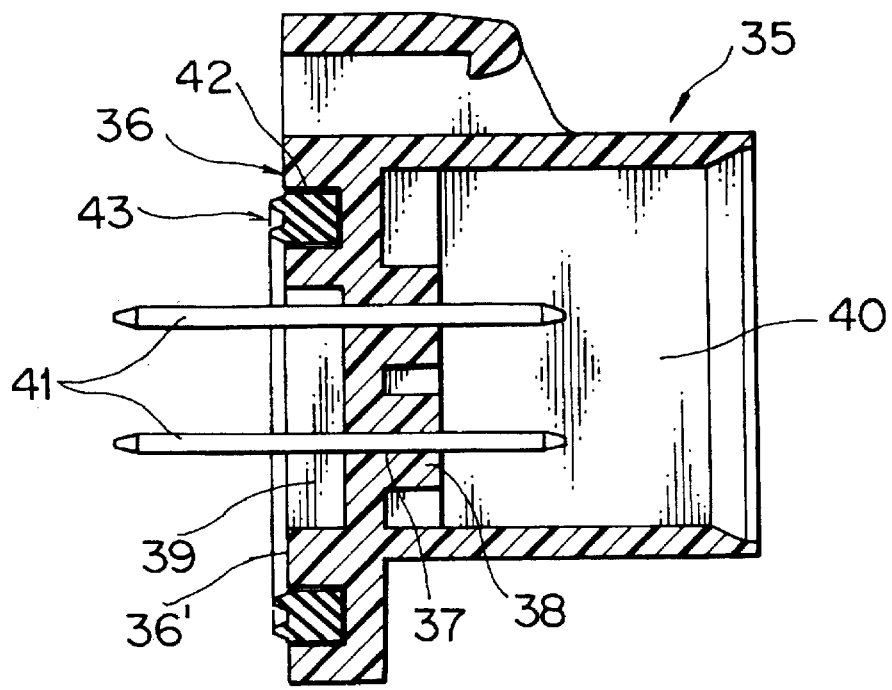
FIG. 9 is a longitudinal sectional view that shows the conventional used connector directly fitted to an appliance.
Figure 12:
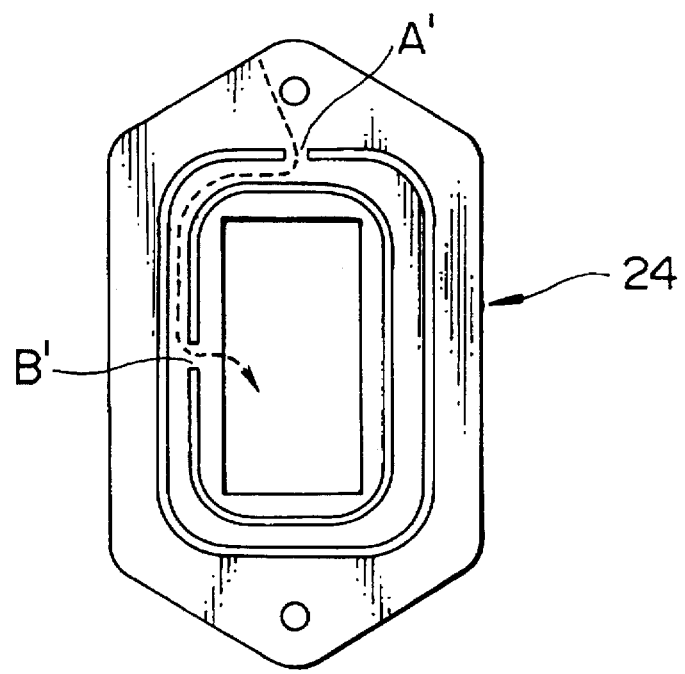
FIG. 12 is an elevational view which shows the condition that sealing projecting strips are partially broken.

For example, as shown in FIG. 4, in the case an outer sealing projecting strip A2 is broken in a small chamber A, so long as an inner projecting strip A1 of the same chamber as the small chamber A isn't broken, sealing, or waterproofing performance of the connector directly fitted to the appliance doesn't decrease.

And, in the case that an inner projecting strip B1 is damaged in a small chamber B, so long as an outer sealing projecting stripe B2 of the same chamber as the small chamber B isn't broken, sealing performance of the connector doesn't decrease. Moreover, when a rib C3 for a partition between a small chamber C and a small chamber D is broken, since a bigger chamber is only formed by the small chamber C and the small chamber D, sealing performance of the connector 10 doesn't decrease.

In addition, even though an outer sealing projecting strip A2 of the small chamber A and an inner projecting strip B1 of the small chamber B are partially broken, if either an inner projecting strip A1 of the small chamber A or an outer projecting strip B2 of the small chamber B isn't partially broken, sealing performance of the connector 10 doesn't decrease. Even though both an outer sealing projecting strip A2 of the small chamber A and an outer sealing projecting strip E2 of a small chamber E are broken, if either the inner sealing projecting strip A1 of the small chamber A or an inner sealing projecting strip E1 of the small chamber E isn't broken, sealing performance of the connector 10 doesn't decrease. Moreover, even if both the inner sealing projecting strip B1 of the small chamber B and an inner sealing projecting strip F1 of a small chamber F are partially broken, so long as either the outer sealing projecting strip B2 of the small chamber B or the outer sealing projecting strip F2 of the small chamber F isn't broken, the sealing performance of the connector directly fitted to the appliance 10 isn't lost.

Even though both the outer sealing projecting strip A2 of the small chamber A and the rib C3 disposed between the small chamber C and the small chamber D are damaged, or both the inner sealing projecting strip B1 of the small chamber B and the rib C3 disposed between the small chamber C and the small chamber D are broken, it is needless to say that sealing performance of the connector 10 doesn't decrease.

What is claimed is:

1. A connector directly fitted to an appliance comprising:
   a mounting plate mounted on a wall of said appliance;
   an annular groove formed in a surface of said mounting plate; and
   a packing means for sealing said annular groove to improve waterproofing performance, wherein said packing means comprises a body having inner and outer sealing projecting strips formed on an upper surface of said body, and a plurality of ribs evenly spaced at predetermined intervals between said inner and outer sealing projecting strips, said inner and outer sealing projecting strips and said ribs, respectively, all have a same height so as to form plural small sealing chambers in said upper surface of said body between said inner and outer sealing projecting strips and said ribs, wherein said packing means is inserted in said annular groove so that plural small chambers face toward said wall of said appliance such that if only one of said inner and outer sealing projecting strips forming one of said small chambers is broken in two, said packing means still maintains said waterproofing performance.

* * * * *